United States Patent
Caudrelier et al.

(10) Patent No.: US 7,231,464 B1
(45) Date of Patent: Jun. 12, 2007

(54) MANAGEMENT SYSTEM FOR MULTIMODULE MULTIPROCESSOR MACHINES

(75) Inventors: Christian Caudrelier, Claix (FR); Lorenzo Olivares, Vittuone (IT); Tony Reix, Echirolles (FR)

(73) Assignee: Bull, SA, Louveciennes (FR)

( * ) Notice: Subject to any disclaimer, the term of this patent is extended or adjusted under 35 U.S.C. 154(b) by 414 days.

(21) Appl. No.: 09/662,893

(22) Filed: Sep. 15, 2000

(30) Foreign Application Priority Data

Sep. 16, 1999  (FR) .................................. 99 11597

(51) Int. Cl.
G06F 15/16 (2006.01)
G06F 15/173 (2006.01)
G06F 15/00 (2006.01)

(52) U.S. Cl. ........................ 709/253; 709/223; 712/10; 712/33

(58) Field of Classification Search ................ 709/238, 709/227, 244, 223, 253; 707/204; 713/502; 712/10, 11, 33
See application file for complete search history.

(56) References Cited

U.S. PATENT DOCUMENTS

| | | | | |
|---|---|---|---|---|
| 5,276,899 A | * | 1/1994 | Neches ........................ 709/240 |
| 5,321,813 A | * | 6/1994 | McMillen et al. ........... 714/798 |
| 5,485,576 A | * | 1/1996 | Fee et al. ...................... 714/56 |
| 5,594,893 A | * | 1/1997 | Byers et al. ................. 713/502 |
| 5,796,937 A |   | 8/1998 | Kizuka |
| 5,951,683 A | * | 9/1999 | Yuuki et al. ................. 709/208 |
| 6,101,425 A | * | 8/2000 | Govindaraj et al. ........ 700/181 |
| 6,260,068 B1 | * | 7/2001 | Zalewski et al. ........... 709/226 |
| 6,275,870 B1 | * | 8/2001 | Claar .......................... 709/323 |
| 6,408,334 B1 | * | 6/2002 | Bassman et al. ............ 709/223 |
| 6,859,882 B2 | * | 2/2005 | Fung ........................... 713/300 |

FOREIGN PATENT DOCUMENTS

EP  0 247 605 A  12/1987

* cited by examiner

*Primary Examiner*—Saleh Najjar
*Assistant Examiner*—Kevin T Bates
(74) *Attorney, Agent, or Firm*—Miles & Stockbridge P.C.; Edward J. Kondracki

(57) ABSTRACT

The present invention relates to a global management system for a multimodule, multiprocessor machine (PK). The system is characterized in that it comprises an independent module (SM) dedicated to the global management of a plurality of first modules (M1 through Mn), the independent module (SM) being connected to a management tool (BUMP) for each of the first modules (M1 through Mn) by a first specific link supporting a given communication protocol that makes it possible to manage each of the first modules at the startup of the machine, during the running of the machine, and after the machine stops running, the independent module (SM) being connected to each of the first modules via a second link, and the independent module also being globally connected to the multimodule machine (PK) via a physical link of a local area network (LAN) linked to at least two of the first modules (M2 and M3).

8 Claims, 2 Drawing Sheets

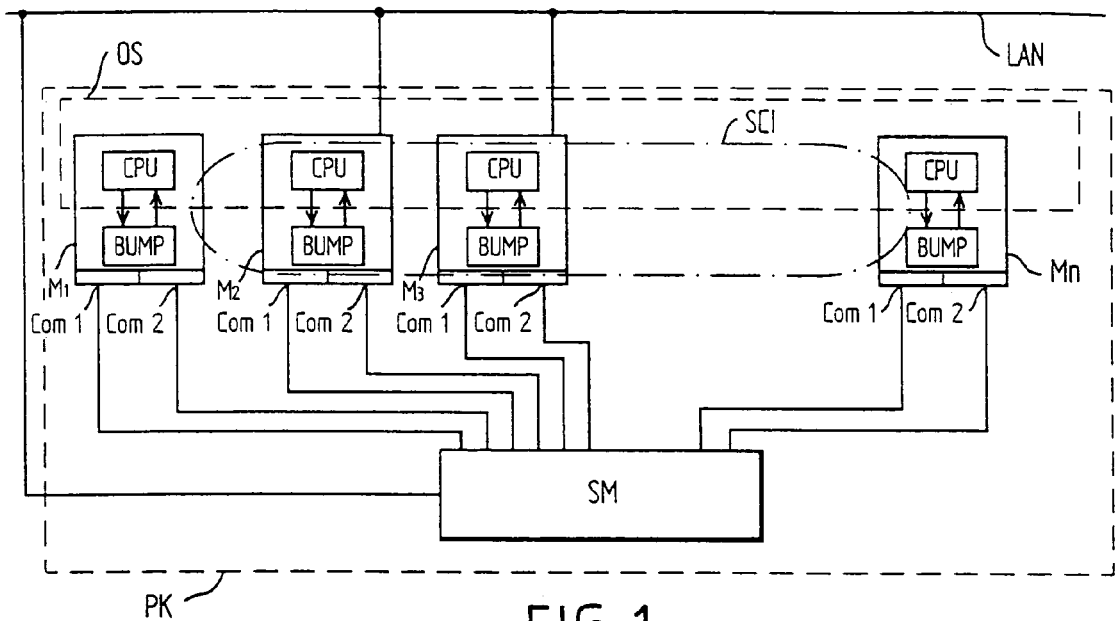
FIG_1
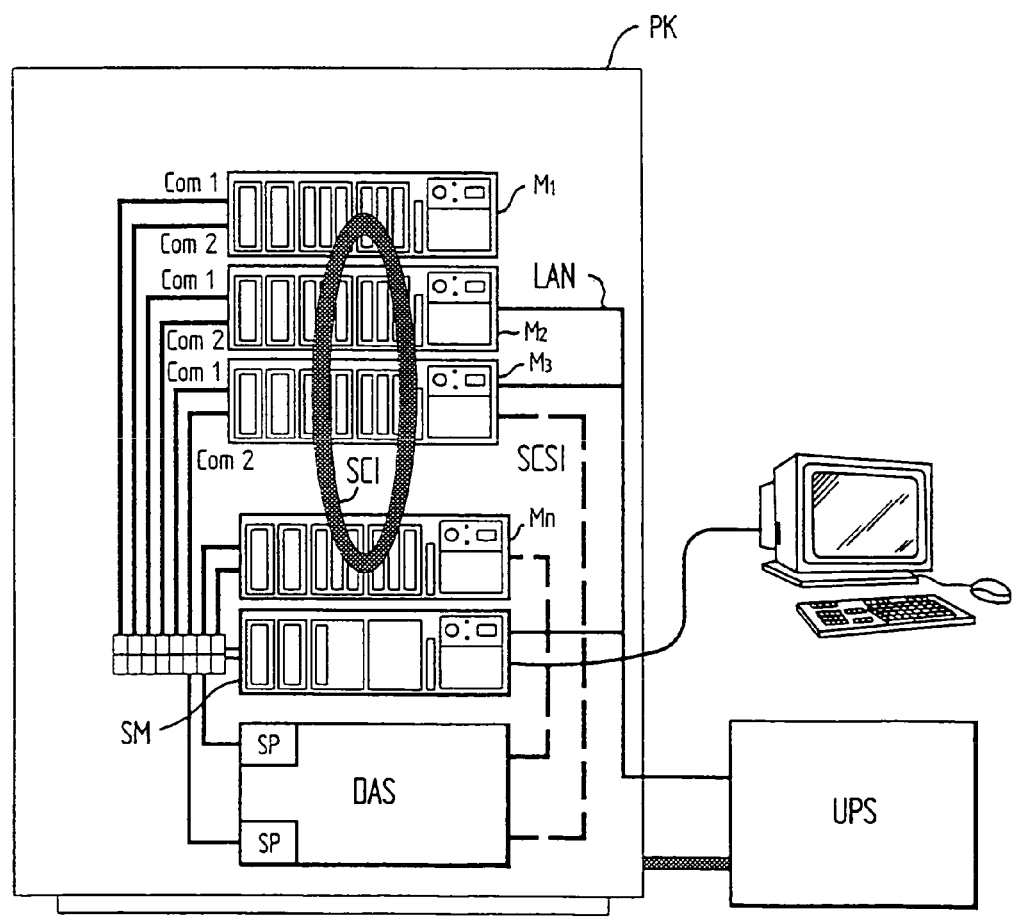
FIG_2

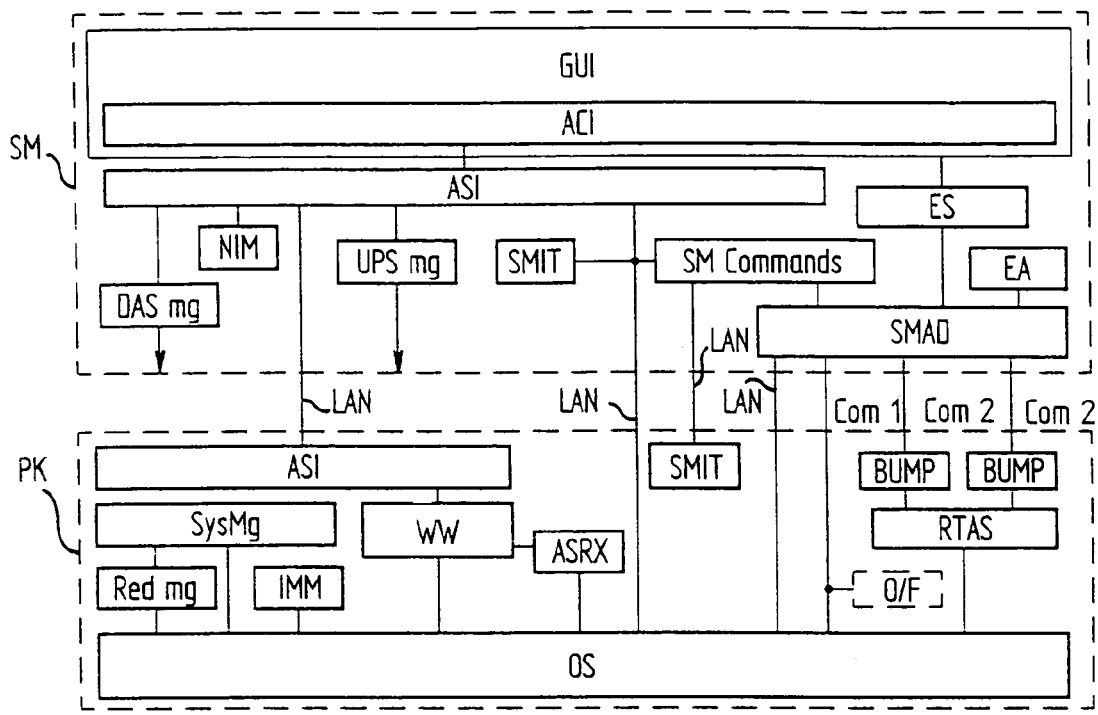
FIG_3
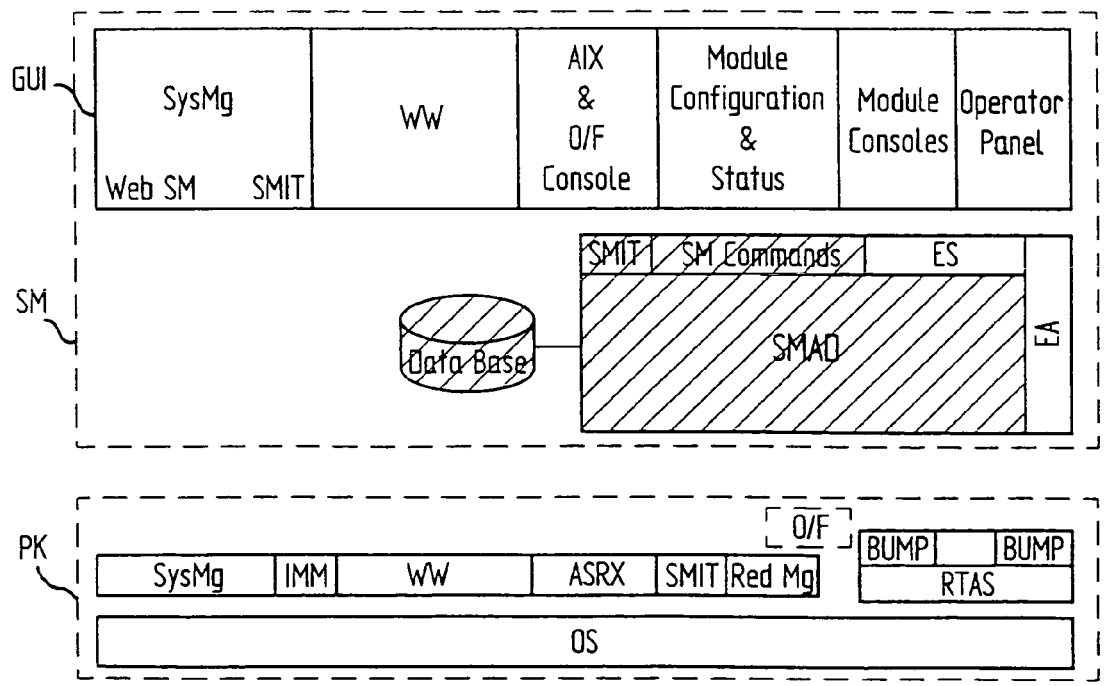
FIG_4

MANAGEMENT SYSTEM FOR MULTIMODULE MULTIPROCESSOR MACHINES

FIELD OF THE INVENTION

The present invention relates to the field of computing machine management, particularly for multimodule machines of the NUMA type, from the abbreviation for "Non-Uniform Memory Access," and more particularly concerns an independent management system that makes it possible to manage the availability of the machine in the various phases of its operation, as a function of the operating states of its multiprocessor modules.

BACKGROUND OF THE INVENTION

A multimodule architecture is composed of several distinct physical entities that are connected to one another through a fast link operating at the level of the system bus, generally of the SCI type, from the abbreviation for Scalable Coherent Interface.

Each entity, hereinafter called a module, is equipped with means for connecting the module to the fast link.

The functionality of a module can be expanded to the management of independent machines, particularly in order to perform a "server consolidation."

The modules generally have a management means called a "Service Processor" (SP), also known as a "BUMP," from the abbreviation for "BringUp Microprocessor," that works like an independent central processor, used during the startup and shutdown of the modules, and in order to perform the monitoring of the modules.

The constraints linked to this functionality can be summarized as follows:
  it is necessary to ensure the synchronous startup of the modules of a machine, given that the machine does not have "global" physical mechanism for starting all of the modules, each module having its own physical start mechanism (push button or key);
  it is necessary to automatically modify the configuration of each machine in case of a failure of a module or of the fast link and reboot the machine, the BUMPs of the various modules not being connected to one another and hence not being able to perform this modification;
  finally, the states of the various modules must be visible through a graphical interface that allows the dynamic display of the states of the various modules.

One possible solution would consist of adding the hardware required to obtain the "global" on/off function.

Such a solution would require the modification of the modules so that they accommodate this new hardware "globally," without taking their own on/off hardware into account.

Another solution would consist of interconnecting the various BUMPs so they can decide on the configuration modifications themselves. This solution would require the addition of hardware for connecting the BUMPs. Moreover, this solution would require complex developments at the "firmware" level, i.e., at the level of the programming software of the BUMP, in order to be able to manage this connection, analyze failures and decide on the configuration modifications to be performed.

It would also be possible to use a graphical screen connected directly to the machine. However, this solution would not make it possible to manage the machine when the system is not running, i.e., when the machine is stopped and under the control of the BUMPs.

SUMMARY OF THE INVENTION

The present invention offers a solution that takes the preceding constraints into account, and specifically makes it possible to eliminate the above-mentioned drawbacks.

The system according to the invention comprises an independent management module called "Service Master" (SM), which is connected to each BUMP by two asynchronous links, one of which is used exclusively for communication with the BUMP in the command mode.

The invention uses a communication protocol that allows this asynchronous link to handle the on/off functions, the dynamic configuration of the machine, and the transmission of the possible failures of one or more modules of the machine.

The system according to the invention also provides a graphical interface that allows the user to manage the machine by giving him access to the on/off functions, the configuration functions and the functions for displaying the state of the machine, either when the machine is running or when it is stopped.

The utilization of an independent management module allows the system according to the invention to offer the user a user-friendly graphical interface, both when the machine is running and when the machine is stopped. This makes it easier to develop failure analysis tools and automatic configuration tools of much greater complexity than what can be produced by the software of the BUMPs, which is very limited in size and complexity.

To this end, the first subject of the invention is a global management system for a multimodule multiprocessor machine comprising a given number of modules respectively comprising a specific management means that makes it possible to manage the availability of the module and comprising at least a first communication port and a second communication port, characterized in that the system also comprises an independent module dedicated to the global management of the modules, the independent module being connected to each management means of the modules via the second communication port and a first specific link supporting a given communication protocol that makes it possible to manage each module at the startup of the machine, during the running of the machine and after the machine stops running, the independent module being connected to the first communication port of each module via a second link, and the independent module also being globally connected to the multimodule machine via a physical link of the network type connected to at least two modules.

BRIEF DESCRIPTION OF THE DRAWINGS

Other advantages and characteristics of the present invention will emerge through the reading of the following description, given in reference to the attached figures, which represent:

FIG. 1, the simplified architecture of a system for managing the modules of a machine, according to the invention;

FIG. 2, the system according to the invention, in its hardware environment;

FIG. 3, the architecture of the multimodule machine of the preceding figures, considered from the functional point of view; and FIG. 4, the various functions handled by the management module of the system according to the invention and accessible through the graphical interface of the management module.

The following description is based on an AIX platform (AIX is IBM's UNIX operating system "OS") and on the standard architecture of a multimodule machine of the NUMA type.

FIG. 1 illustrates the simplified architecture of a management system according to the invention.

DESCRIPTION OF THE PREFERRED EMBODIMENTS

A management module SM, independent from the other modules M1 through Mn of the machine PK, is connected by a first physical communication link to the operating system of the machine, hereinafter called OS.

This physical link, in the embodiment in question, is a private local area network, hereinafter called LAN, for "Local Area Network."

The OS and the machine are delimited by respective closed broken lines.

The management module is also connected by a specific link, via one of the communication ports of the modules, to each means for managing the modules.

Each module comprises two serial communication ports, respectively a first communication port Com 1 and a second communication port Com 2.

The first communication port Com 1 is reserved for the standard operation of the system console of each module. It makes it possible to connect the management module SM either to the console of the BUMP when the system is shut down or in the process of starting up, or to the system console of the OS when the system is running, for example via first standard RS232 links.

The second communication port Com 2 is specifically reserved for connecting the management module SM to the BUMP of the module, for example also via second standard RS232 links.

These two links carry the control information exchanged between the management module SM and the BUMP of each module, in accordance with a given communication protocol.

FIG. 2 also schematically illustrates the system according to the invention, in its hardware environment.

It makes it possible to distinguish the main hardware components of a multimodule machine as well as the various links between the management module SM and the other hardware components of the machine.

The management module SM is connected:
- to the BUMP of each module by an RS232 link connected to the port Com 2 of the module;
- to the console output of the operating system of the machine by a given number of RS232 links, respectively linking the management module to the port Com 1 of each module;
- to the operating system by a LAN, private for security reasons. In this configuration, this LAN is connected to separate first and second modules, but only one of the two connections is used at one time, the other connection being used in case of a failure of the first module or of the module to which it is connected;
- to a backup power supply unit UPS via the LAN for controlling and driving the power supply unit;
- to the storage subsystem, for example a DAS (for "Disk Array System") via two RS232 links, in order to dialog with the processors that manage the storage subsystem when the links carrying the data (SCSI, for Small Computer System Interface, or fiber) have not yet been configured. The DAS is an example of a subsystem that is initialized through an RS232 link; and
- to an external display terminal that allows the real-time display, via a graphical interface, of the global state of the modules in the form of an "active" and interactive window.

FIG. 3 schematically illustrates the architecture of the multimodule machine of the preceding figures, considered from the functional point of view.

The various functions, represented in the form of functional blocks, are grouped into two sets delimited by respective closed broken lines, representing the machine PK and the management module SM. The management module SM comprises a graphical interface GUI, which itself comprises a Client management module ACI for the Client/Server applications.

The graphical interface GUI is connected via the Client management interface ACI to a Server management module, and via an event server ES to a "demon" SMAD belonging to a management agent SMA not represented. (A demon is a dormant process or task that wakes up when a given event occurs.)

The Server management interface ASI is connected to the following functional blocks:
- a block DAS mg, for managing the storage subsystem DAS;
- a block NIM for managing the network installation;
- a block UPS mg, for managing the backup power supply UPS;
- a block SMIT, which is a system interface management tool;
- a block SM Commands, containing the various commands sent to the machine.

The Server management interface ASI of the management module SM is also directly connected to the Server interface ASI of the machine PK via the LAN.

The block SM Commands is connected, via the LAN, to the block SMIT of the machine PK, and is itself connected to the OS of the machine, and to the block SMAD.

The block SMAD is directly connected, via the LAN and via the communication port Com 1 of the main module, to the OS of the machine.

It is also connected to the BUMPs of the modules, via their respective communication ports Com 2.

The Server interface ASI of the machine is connected to the OS via a block SysMg for managing the OS.

This management block SysMg is also connected to the OS via a redundancy control block RedMg, and via a block IMM for managing internal "mirror" disks. This block SysMg can also be integrated into the Server interface ASI of the machine PK as an application.

The Server interface ASI of the machine PK is also connected to the OS via a block WW corresponding to a user-friendly application that allows the user to have an internal view of the machine. This block WW can also be integrated into the Server interface ASI of the machine PK.

It is also connected to a block ASRX that collects and reports information on the activity of the OS, and that is itself connected to the OS.

The BUMPs of the modules are connected to the OS via a block RTAS, which serves as a programmable interface between the BUMPs and the OS.

Finally, a block O/F, represented by a closed broken line, is connected to the link linking the block SMAD and the OS. This block O/F is only present and active during one of the startup phases of the system.

In this architecture, the graphical interface GUI of the management module SM is capable of managing, in the same window, objects from both the management module SM and from the machine PK.

FIG. 4, to be considered in tandem with FIG. 3, illustrates the various functions handled by the management module SM of the system according to the invention and accessible through the graphical interface GUI of the management module SM.

These various functions are listed below:
the "Operator Panel" function;
the "Module Consoles" function;
the "Module Configuration & Status" function;
the "AIX & O/F Console" function;
the "WW" function; and
the "System Management" function.

These various functions are described in detail below.

The "Operator Panel" function is presented in the form of a control panel, and breaks down into several sub-functions, consisting of:
giving the on/off status;
acting as an on/off interpreter that handles:
the powering up of the operating system (all the available modules) using a fast or normal initial program load;
the powering down of the operating system (as a result of a UNIX system shutdown command or a power cutoff);
the restarting of the system (as a result of a UNIX system shutdown and reboot command, a reboot, a hardware or software reset);
giving the state of the system (off, currently rebooting, currently running; currently shutting down; faulty);
giving the physical position of the key (normal/service);
providing a graphical display of the values displayed on the digital readout of the main module, i.e., the digital readout of the system.

The system shutdown and reboot functions are both performed by system shutdown and reboot commands activated from the operating system of the machine via the LAN, while the other functions are performed using a given protocol through the RS232 links connected to each BUMP, as described above.

The "Module Consoles" function is used each time a user wants to open a virtual console through the RS232 link connected to the communication port Com 1 of a module. This function is activated from the configuration screen of this module.

The type of console depends on the state of the module at the opening of the window:
when the module is on standby or faulty, the console provides access to the standby menu of the BUMP;
when the module is unavailable (disabled), the console is then equivalent to an alphanumeric terminal connected to the communication port Com 1 of the module;
when the module is not in one of the following states—on standby, faulty or unavailable—the console acts like a simple display window without any possible interaction from the keyboard of the console.

The state of a console of a module automatically changes between the "interactive" mode and the "display" mode when the module is in the "standby" mode and when the user starts up the system.

When a console is in the "display" mode, its state cannot change without its being closed in order for a new one to be opened.

The "Module Configuration & Status" function breaks down into several sub-functions:
display of the modules in their hardware environment;
state of each module (available, unavailable or faulty);
properties of the module:
detailed state:
available (on standby, booting up, running);
unavailable (connected, disconnected);
faulty (causes if they exist).
action for a new startup (available, unavailable);
access to the console of the module (the window is displayed on the display terminal).

The state of a module is a combination of the result of the user's action (available or unavailable), the value returned by a BUMP (on standby, running, or faulty) and the result of the test of the link (connected or disconnected).

The "AIX & O/F Console" function is activated each time the user wants to open a "virtual" console (a terminal emulation window) through the RS232 link connected to the communication port Com 1 of the main module.

This console corresponds to the console of the OS when the OS is running, or to the console of the programmable interface O/F ("Open Firmware") when the block O/F is running.

This function is the only one that can be activated for special operations such as:
debugging the kernel;
installing the OS;
maintenance operations on the OS (bootup in Service mode);
displaying the initialization of the OS;
operations of the programmable interface O/F.

The function of the block WW is symbolized by an icon that identifies the state displayed by the page of OS states, for example using three different colors: red, yellow and green.

The icon is "red" if at least one state of the page is "red," and the icon is "yellow" if at least one state of the page is "yellow" and if there is no "red" state. Otherwise, the icon is "green."

The "System Management" function is symbolized by a first icon "WebSM" that provides access to the Client/Server applications of the machine.

It is symbolized by a second icon "SMIT" that provides access to the menus of the SMIT function. This function is a tool that is part of the OS that makes it possible to create an interface between the OS and a menu accessible by the user and that may or may not allow the dialog between the user and the OS.

The following description details the various functions performed by the management agent SMA:

These various functions are listed below:
command interface (via a "socket" dedicated to the communication of commands; a "socket" defines an application programming interface);
Server event interface (via a "socket" dedicated to the sending of asynchronous events);
automatic module configuration (choice of the main module and hardware configuration table);
supervision of the bootup (for updating the state of the module during the various phases of the bootup);
capture of errors issuing from the faulty module (in order to collect information on the faulty module and restart the bootup without this module).

The agent SMA comprises four main functional blocks, hatched in FIG. 4, which are detailed below.

The first block SMAD is a "demon" in charge of responding to requests emanating from the graphical interface GUI via the commands of the management module SM.

It handles the updating of the state table of the modules of the machine. It takes care of the dialog with the BUMP of each module for supplying the state table and performing functionalities such as "Operator Panel," "Module Consoles" and "Module Configuration & Status" using a given protocol between the management module and the BUMP, which protocol is described below.

It also handles the function of supervising the bootup, including the capture of the errors coming from the faulty module and the restart of the bootup.

It starts the error analyzer in the case of a "crash" of the OS and based on the result, deactivates the faulty component (processor, memory or module) by sending a given command to the corresponding BUMP.

It also takes care of the configuration of the link with the "AIX & O/F" console.

It is capable of sending specific commands to the OS via the LAN.

The second block "Data Base" is a database that contains a file listing all of the machines managed by the management module SM.

It also contains the connection (error and history) files, which are periodically saved in a file of the management module SM.

Commands for updating the database are required in order to eliminate inconsistencies between the result of the commands in the interface with the "demons" and the result of the commands that search for information directly in the configuration files. These commands are necessary for automatically creating the system "demons" and the associated commands. When the configuration files are modified, the previous configuration is saved as a backup configuration, until a new configuration is validated.

The third block, SM Commands, contains the commands used by the graphical interface GUI.

There are two types of commands:

the commands that retrieve the information from the database Data Base; and the commands that send a request to the management agent SMAD in question.

The command for shutting down or rebooting the OS of the machine also sends such a request to the management agent SMAD, which is in charge of sending the appropriate command to the machine via the LAN.

The fourth block SMIT, described above, contains the following functions:

operator panel;

"module & status" configuration, including the connection log and a history;

"module" consoles;

"AIX & O/F" console;

access to the SMIT of the platform via the LAN; and management of the DAS.

These functions are hosted by the block SM Commands.

The block EA is an error analyzer that is in charge of analyzing the various types of errors that can occur in the machine.

It is automatically called by the function for capturing errors coming from the faulty module of the agent SMAD, mentioned above in the description of the agent, and analyzes the information received from the agent SMAD after a "crash" of the OS in order to determine the faulty component.

The result of the analysis is then stored in a given file of the block and used by the agent SMAD to deactivate the component detected as faulty by the block EA.

The block ES acts like a gateway between the SMAD (called "Source"), which sends events, and the graphical interface GUI (called "Client"), which receives the events.

The logical format of the protocol used for the exchanges between a BUMP and the management module SM is given below:

The messages sent by a BUMP to the management module SM must have the following logical format:

<start of message>CTRL_(0x1F_<type of message>CTRL_<message>CTRL_<end of message>\n\r with:

| | |
|---|---|
| <start of message> | 1 character (STX = "CTRL B") |
| <type of message> | <character><type number> |
| <character> | 1 character,   # for a message |
| | > for the response |
| <type number> | code of the message |
| <message> | content of the message or response |
| <end of message> | 1 character (ETX = "CTRL C") |

The commands sent by the management module SM must have the following format:

<start of command>CTRL_<type of command>CTRL_<parameter>CTRL_<end of command>\n\r with:

| | |
|---|---|
| <start of command> | 1 character (STX = "CTRL B") |
| <type of command> | <character><code of the command> |
| <character> | 1 character, S for "Set," G for "Get" |
| <code of command> | identification number of the command |
| <parameters> | parameters related to the code of the command |
| <end of command> | 1 character (ETX = "CTRL C") |

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A global management system for a multimodule multiprocessor machine (PK) comprising:

a given number of first modules (M1 through Mn), each first module comprising a specific management tool (BUMP) for managing the availability of the module, and at least a first communication port (Com 1) and a second communication port (Com 2), and an independent module (SM) dedicated to global management of the first modules (M1 through Mn), the independent module (SM) being configured to communicate using a plurality of first specific links, a plurality of second links, and a third link comprising a physical link of a local area network (LAN), wherein the independent module (SM) is connected to each management tool (BUMP) of each of the first modules (M1 through Mn) via the second communication port (Com 2) of the first module and one of the plurality of first specific links supporting a given communication protocol for managing each of the first modules at the startup of the multimodule multiprocessor machine, during the running of the multimodule multiprocessor machine and after the multimodule multiprocessor machine stops running, and wherein the independent module (SM) is connected to the first communication port (Com 1) of each of the first modules via one of the plurality of second links, and wherein the independent module is also globally connected to the multimodule multiprocessor machine (PK) via the physical link of the local area network (LAN) that is also connected to at least two of the first modules (M2 and M3); and wherein the management module (SM) comprises a graphical interface (GUI) comprising a Client management module (ACI) dedicated to Client/Server applications;

a Server management module (ASI) connected to the Client management module (ACI);

a command block (SM Commands) containing various commands sent to the multimodule multiprocessor machine, said block (SM) being connected to the Server management module (ASI);

an event server (ES) connected to the graphical interface (GUI);

a demon (SMAD) connected to the event server (ES) and to the command block (SM Command);

an error analysis block (EA) connected to the demon (SMAD);

a network installation management block (NIM) connected to the Server management module (ASI); and a system interface management block (SMIT) connected to the Server management module (ASI) and to the command block (SM Commands).

2. A system according to claim 1, further comprising a graphical interface (GUI) connected to the management module SM, and to each first module (M1 through Mn), and configured for monitoring a global state of each of the first modules of the multimodule multiprocessor machine in real time and to interact in the running of the multimodule multiprocessor machine.

3. A system according to claim 2, wherein the graphical interface (GUI) is represented on the screen of a display terminal connected to the management module (SM) in the form of active and interactive windows, each window representing the state of one of the first modules.

4. A system according to claim 1, wherein the multimodule multiprocessor machine (PK) includes a storage subsystem (DAS) and further comprises a block (DAS mg) for managing the storage subsystem (DAS) of the multimodule multiprocessor machine (PK), the block (DAS mg) being connected to the Server management module (ASI) and to a block (UPS mg) for managing a backup power supply of the multimodule multiprocessor machine, connected to the Server management module (ASI).

5. A system according to claim 4, wherein the multimodule multiprocessor machine (PK) comprises:

an operating system (OS);

a Server management interface (ASI) connected to the Server management interface (ASI) of the management module (SM) via the private local area network (LAN);

a block (SysMg) for managing the operating system (OS) connected between the operating system (OS) and the Server interface (ASI) of the multimodule multiprocessor machine (PK);

a redundancy control block (RedMg) connected between the operating system (OS) and the block (SysMg) for managing the operating system (OS);

a block (IMM) for managing internal "mirror" memories, connected between the operating system (OS) and the block (SysMg) for managing the operating system (OS);

a block (WW) corresponding to a user-friendly application that allows the user to have an internal view of the multimodule multiprocessor machine, connected between the operating system (OS) and the Server management interface (ASI) of the multimodule multiprocessor machine (PK);

a block (ASRX) that collects and reports information on the activity of the operating system (OS) connected to the operating system (OS) and to the block (WW) corresponding to an application;

a system interface management block (SMIT), connected to the operating system (OS) of the multimodule multiprocessor machine and to the command block (SM Commands) of the management module (SM) via the local area network (LAN);

a block (RTAS) connected between the management means of the modules (BUMP) and the operating system (OS), and serving as a programmable interface; and a programmable interface block (O/F), connected to a link linking the demon (SMAD) and the operating system (OS).

6. A system according to claim 1, wherein the multimodule multiprocessor machine (PK) comprises:

an operating system (OS);

a Server management interface (ASI) connected to the Server management interface (ASI) of the management module (SM) via the local area network (LAN);

a block (SysMg) for managing the operating system (OS) connected between the operating system (OS) and the Server interface (ASI) of the multimodule multiprocessor machine (PK);

a redundancy control block (RedMg) connected between the operating system (OS) and the block (SysMg) for managing the operating system (OS);

a block (IMM) for managing internal "mirror" memories, connected between the operating system (OS) and the block (SysMg) for managing the operating system (OS);

a block (WW) corresponding to a user-friendly application that allows the user to have an internal view of the multimodule multiprocessor machine, connected between the operating system (OS) and the Server management interface (ASI) of the multimodule multiprocessor machine (PK);

a block (ASRX) that collects and reports information on the activity of the operating system (OS) connected to the operating system (OS) and to the block (WW) corresponding to an application;

a system interface management block (SMIT), connected to the operating system (OS) of the multimodule multiprocessor machine and to the command block (SM Commands) of the management module (SM) via the local area network (LAN);

a block (RTAS) connected between the management means of the first modules (BUMP) and the operating system (OS), and serving as a programmable interface; and a programmable interface block (O/F), connected to a link linking the demon (SMAD) and the operating system (OS).

7. A system according to claim 1, wherein each said specific link supporting the given communication protocol is an alphanumeric link.

8. A system according to claim 1, wherein the physical link is a TCP/IP link.

* * * * *